United States Patent [19]

Boultinghouse

[11] Patent Number: 4,492,784

[45] Date of Patent: Jan. 8, 1985

[54] ADHESIVE FOR BUTADIENE STYRENE COPOLYMER

[75] Inventor: Harold D. Boultinghouse, Bartlesville, Okla.

[73] Assignee: Phillips Petroleum Company, Bartlesville, Okla.

[21] Appl. No.: 523,531

[22] Filed: Aug. 16, 1983

[51] Int. Cl.³ ............................................. C08K 5/02
[52] U.S. Cl. ................................... 524/473; 523/176; 524/560; 524/562
[58] Field of Search ................ 524/473, 560, 562; 523/176

[56] References Cited

U.S. PATENT DOCUMENTS

| | | | |
|---|---|---|---|
| 3,772,409 | 11/1973 | Scarso et al. | 525/84 |
| 3,775,521 | 11/1973 | Yamamoto et al. | 264/45 |
| 3,956,424 | 5/1976 | Murayama et al. | 525/76 |
| 4,022,745 | 5/1977 | Schoen et al. | 524/473 |

*Primary Examiner*—Joseph L. Schofer
*Assistant Examiner*—J. M. Reddick

[57] ABSTRACT

An adhesive composition for binding a resinous, essentially non-elastomeric monovinyl aromatic-conjugated diene copolymer to itself, consisting essentially of (a) from about 10–90 weight percent of at least one solvent selected from the group consisting of perchloroethylene, 1,1-dichloroethane, and 1,1,1-trichloroethane and (b) from about 90–10 weight percent of a copolymer consisting of a vinyl arene and an acrylate.

5 Claims, No Drawings

ADHESIVE FOR BUTADIENE STYRENE COPOLYMER

This invention relates to an adhesive composition suitable for bonding a monovinyl aromatic-conjugated diene copolymer, containing at least 60 weight percent monovinyl aromatic, to itself.

The use of monovinyl aromatic-conjugated diene copolymers, which contain more monovinyl aromatic than conjugated diene, in articles of manufacture has increased in recent years. One such copolymer is called K-Resin ® and is manufactured and marketed by Phillips Chemical Company, Bartlesville, Oklahoma. K-Resin ® normally has about 76 weight percent block styrene with a weight average molecular weight of about 140,000 to 190,000. These copolymers can be molded into such diverse articles of manufacture as blister packages, tubings, and films. Thus, there are several instances where such polymers may be bonded together.

There are several different types of solvent based adhesive compositions, many of which employ methylene chloride as the solvent, which are currently used to bond such polymers to one another. However, they are not used without some difficulties. These difficulties include flammability, noxious odors, and evaporation of the solvent before it can be used as an adhesive. Therefore, an adhesive composition which would bind such polymers to themselves without encountering the above difficulties would be highly desirable.

It is therefore an object of this invention to provide an improved adhesive composition for binding monovinyl aromatic-conjugated diene copolymers to themselves, the copolymers containing more monovinyl aromatic than conjugated diene.

Other aspects, objects, and advantages of this invention will become apparent from a study of this specification and the appended claims.

In accordance with the present invention, I have discovered that an adhesive composition consisting essentially of (1) from about 10-90 weight percent of at least one solvent selected from the group consisting of perchloroethylene, 1,1-dichloroethane, and 1,1,1-trichloroethane and (2) from about 90-10 weight percent of a copolymer consisting essentially of a vinyl arene and an acrylate makes a surprisingly good adhesive for bonding a resinous, essentially non-elastomeric monovinyl aromatic-conjugated copolymer to itself, the copolymer having more monovinyl aromatic than conjugated diene.

Preferably, the resinous, essentially non-elastomeric monovinyl aromatic-conjugated diene copolymer will have about 60 weight percent or greater styrene content.

Preferably, the monovinyl aromatic-conjugated diene copolymer will be a styrene-butadiene copolymer and most preferably, it will be K-Resin ®.

The vinyl arene-acrylate copolymers useful in this invention can be prepared by copolymerizing at least one vinyl arene such as styrene, alpha-methylstyrene, o-, m- or p-vinyltoluene, 2,4-dimethylstyrene, 2,4-diethylstyrene, 2-chlorostyrene, 2-chloro-5-methylstyrene, vinylnaphthalene and the like, or mixtures thereof, with at least one substituted or unsubstituted alkyl acrylate, such as methyl acrylate, ethyl acrylate, isopropyl acrylate, butyl acrylate, methyl methacrylate, ethyl methacrylate, butyl methacrylate, hexyl methacrylate, cyclohexyl methacrylate, methyl ethacrylate, and the like, or mixtures thereof. The presently preferred vinylarene-acrylate copolymer is a styrene-methyl methacrylate copolymer.

The weight ratio of vinyl arene-to-acrylate polymer within the final copolymer product can vary from about 5:95 to about 95:5 weight percent, preferably in the range of from about 50:50 to about 90:10 weight percent.

The most preferred vinylarene/acrylate copolymer for use in the present invention is Noan 80 ®, a styrene-methyl methacrylate copolymer having a bound styrene content of 80 weight percent, a melt flow of about 2.0 g/10 minutes (ASTM D-1238 Condition G), a specific gravity of 1.08, a melt temperature of 216° C., and a deflection temperature (annealed, ASTM D-648) of 99° C., marketed by Richardson Company, Madison, Connecticut.

Perchloroethylene, 1,1-dichloroethane, and 1,1,1-trichloroethane are commercially available solvents, for example, from Dow Chemical Company, Midland, Michigan.

It is presently preferred that the adhesive consist essentially of about 40–80 weight percent of the perchloroethylene, 1,1-dichloroethane, or 1,1,1-trichloroethane solvent and from about 60–20 weight percent of the vinyl arene-acrylate copolymer. Presently preferred is an adhesive composition which consists essentially of (1) about 75 weight percent perchloroethylene, 1,1-dichloroethane, or 1,1,1-trichloroethane solvent and (2) about 25 weight percent of a styrene-methyl methacrylate copolymer.

The adhesive composition can be prepared by merely blending the solvent and vinyl arene-acrylate copolymer.

The inventive adhesive composition may be applied to the resinous, essentially nonelastomeric styrene-butadiene copolymer by dipping, painting, spraying or other appropriate means.

The following Examples illustrate the present invention.

EXAMPLE I

Preparation of Adhesive Composition 30 grams of a mixed solvent solution was prepared by admixing 27 grams of perchloroethylene solvent and 3 grams of 1,1,1-trichloroethane solvent. Approximately 10 grams of Noan 80 ® in solid pellet form was then dissolved in the 30 grams of mixed solvent solution using a magentic stirrer. The thus prepared solution containing the solvent and dissolved Noan 80 ® was useful as an adhesive as demonstrated in Example II.

EXAMPLE II

Two pieces of K-Resin ® were cut into squares approximately 6" by 6". A 1" wide strip of the K-Resin ® surface was wetted with a solvent solution as prepared above in Example I on both mating parts and then allowed to sit for approximately 30 seconds. The two pieces were then clamped together until the two parts were bonded. The parts were firmly bonded in 5 minuites, but were allowed to cure 24 hours prior to testing which was conducted by hand pulling for shear, tear, and peel resistance. After testing, the parts were still securely bonded to each other thus demonstrating that the adhesive composition was effective for bonding K-Resin ® to itself.

Reasonable variations and modifications are possible from the present invention without departing from the spirit or scope thereof.

I claim:

1. An adhesive composition consisting essentially of:
   (a) from about 10-90 weight percent of at least one solvent selected from the group consisting of perchloroethylene, 1,1-dichloroethane and 1,1,1-trichloroethane; and
   (b) from about 90-10 weight percent of a copolymer consisting of at least one vinyl arene selected from the group consisting of styrene, alpha-methyl styrene, o-, m-, or p-vinyltoluene, 2,4-dimethylstyrene, 2,4-diethylstyrene, 2-chlorostyrene, 2-chloro-5-methylstyrene, vinylnaphthalene and at least one substituted or unsubstituted alkyl acrylate, selected from the group consisting of methyl acrylate, ethyl acrylate, isopropyl acrylate, butyl acrylate, methyl methacrylate, ethyl methacrylate, butyl methacrylate, hexyl methacrylate, cyclohexyl methacrylate, and methyl ethacrylate wherein the weight ratio of vinyl arene to acrylate in the copolymer of (b) is about 5:95 to about 95:5.

2. An adhesive composition according to claim 1 wherein the weight ratio of vinyl arene to acrylate in the copolymer of 1(b) is about 50:50 to 90:10.

3. An adhesive composition according to claim 1 consisting essentially of about 40 to 80 weight percent of 1(a) and about 60 to 20 weight percent of 1(b).

4. An adhesive according to claim 1 wherein said vinylarene-acrylate copolymer is styrene-methyl methacrylate.

5. An adhesive according to claim 1 consisting essentially of about 75 weight percent of said solvent and about 25 weight percent of a styrene-methyl methacrylate copolymer.

* * * * *